US008061180B2

(12) United States Patent
Green

(10) Patent No.: US 8,061,180 B2
(45) Date of Patent: Nov. 22, 2011

(54) METHOD OF VALVE CALIBRATION

(75) Inventor: Francisco Roberto Green, Dayton, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 887 days.

(21) Appl. No.: 12/043,611

(22) Filed: Mar. 6, 2008

(65) Prior Publication Data

US 2009/0223358 A1 Sep. 10, 2009

(51) Int. Cl.
*G01L 27/00* (2006.01)

(52) U.S. Cl. ........................................................ 73/1.72

(58) Field of Classification Search .................... 73/1.72
See application file for complete search history.

(56) References Cited

U.S. PATENT DOCUMENTS

| | | | | |
|---|---|---|---|---|
| 4,914,593 | A | 4/1990 | Middleton et al. | |
| 5,393,167 | A * | 2/1995 | Fujita et al. | 404/84.1 |
| 5,484,227 | A * | 1/1996 | Ikeda et al. | 404/84.1 |
| 5,623,093 | A * | 4/1997 | Schenkel et al. | 73/1.01 |
| 5,762,475 | A | 6/1998 | Maddock et al. | |
| 6,397,655 | B1 * | 6/2002 | Stephenson | 73/1.72 |
| 7,266,467 | B1 | 9/2007 | Peake | |
| 2005/0171668 | A1 | 8/2005 | Allerding et al. | |

OTHER PUBLICATIONS

Asphalt Paver Handbook for Caterpillar B-Series and Barber Greene C-Series Asphalt Pavers; Caterpillar; 2005; pp. 32-35, 48-49, 58-59.
MOBA-matic Operating Instructions; MOBA Mobile Automation AG; Mar. 2005; pp. 25, 43, 48.

* cited by examiner

*Primary Examiner* — Hezron E Williams
*Assistant Examiner* — Rodney T Frank
(74) *Attorney, Agent, or Firm* — Dinsmore & Shohl LLP

(57) ABSTRACT

A method of calibrating an electrically actuated hydraulic valve in a system that controls the flow of hydraulic fluid to a hydraulic cylinder connected to a machine element operates automatically. The system includes an ultrasonic sensor providing an indication of the position of the machine element. The calibration method includes the step of automatically applying a command signal to the hydraulic valve while monitoring the ultrasonic sensor to determine the level of the command signal required to cause the hydraulic cylinder to begin to move. The calibration method includes the additional step of automatically applying in succession a plurality of command signals of increasing level to the hydraulic valve while monitoring the ultrasonic sensor to determine the speed of movement of the hydraulic cylinder resulting from each of the command signals. Finally, the calibration method includes the steps of storing the level of the command signal required to cause the hydraulic cylinder to begin to move, and storing the speed of movement of the hydraulic cylinder resulting from each of said plurality of command signals of increasing level.

27 Claims, 7 Drawing Sheets

METHOD OF VALVE CALIBRATION

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates to calibrating electrically actuated hydraulic valves of the type that control the application of hydraulic fluid to hydraulic cylinders in various machines. More specifically, the present invention relates to a method of calibrating valves associated with hydraulic cylinders in asphalt screeds in earth moving machine, and in other similar machines. The invention contemplates using sensors, such as acoustic or ultrasonic sensors that are relatively noisy, to monitor cylinder movement during the calibration process.

Various types of machines, such as earth grading and paving machines, operate in an automatic or semi-automatic mode using one or more sensors, such as ultrasonic or acoustic sensors, to control the movement of machine elements. For example, an asphalt paving machine deposits a layer of asphalt as it moves along a roadbed, with the thickness of the layer being based on the relative height of an adjacent reference surface or an adjacent reference string. It is common to measure this relative height with an ultrasonic transducer that directs pulses of sonic energy downward, and measures the time required for the sonic energy to reach the reference surface or string and to be reflected back to the transducer. This measured time is directly related to the distance from the transducer to the reference surface or string.

An asphalt paving machine typically uses a screed which is pulled behind the machine to control the thickness of the asphalt layer. The screed is pulled by a pair of screed tow arms which extend forward along the sides of the paving machine. Raising the tow points of the screed tow arms causes the angle of attack of the screed to change, resulting in a thicker layer of asphalt. Lowering the tow points of the screed tow arms correspondingly reduces the thickness of the asphalt layer. The tow points of the screed tow arms are raised and lowered by a pair of hydraulic cylinders that receive hydraulic fluid through electrically actuated hydraulic valves. The valves receive command signals which vary in level from a control circuit that is responsive to an ultrasonic transducer. The ultrasonic transducer may be mounted on one of the tow arms.

When the ultrasonic control system is added to the paving machine, it is necessary to calibrate various aspects of the control system, including the hydraulic valves that raise and lower the tow points. In the past, the valves in paving machines having ultrasonic sensors have been calibrated manually, or calibrated using sensors other than the ultrasonic sensors, since it has been found that ultrasonic sensors typically are too noisy to be used in automatic calibration techniques for valves. Manual calibration is time consuming and providing other sensors for valve calibration adds to the cost and complexity of the systems. It is seen, therefore, that there is a need for an automated method for calibrating valves in a paving machine control system in which the calibration method utilizes the ultrasonic transducer that is an integral part of the control system.

SUMMARY

This need is met by a method according to the present invention for automatically calibrating an electrically actuated hydraulic valve in a system that controls the flow of hydraulic fluid to a hydraulic cylinder connected to a machine element. The system also includes an ultrasonic sensor providing an indication of the position of the machine element. The method includes the steps of automatically applying a command signal to the hydraulic valve while monitoring the ultrasonic sensor to determine the level of the command signal required to cause the hydraulic cylinder to begin to move, and automatically applying in succession a plurality of command signals of various levels to the hydraulic valve while monitoring the ultrasonic sensor to determine the speed of movement of the hydraulic cylinder resulting from each of the command signals. Additionally, the method includes the step of storing the level of the command signal required to cause the hydraulic cylinder to begin to move, and storing the speed of movement of the hydraulic cylinder resulting from each of the plurality of command signals of various levels. The plurality of command signals of various levels may be presented as successively increasing command signals or as successively decreasing command signals.

The method may further include the step of selecting a valve to calibrate. The method may also include the step of positioning an ultrasonic sensor at an appropriate position to monitor movement of the cylinder or movement of the machine element.

The step of automatically applying a command signal to the hydraulic valve while monitoring the ultrasonic sensor to determine the level of the command signal required to cause the hydraulic cylinder to begin to move may include the step of automatically applying a low level command signal to the hydraulic valve for a predetermined period of time while monitoring the cylinder or the machine element for movement and, if no movement is noted during the predetermined period of time, repeatedly increasing the level of the command signal for predetermined periods of time until movement is first noted.

The step of automatically applying in succession a plurality of command signals of various levels to the hydraulic valve while monitoring the ultrasonic sensor to determine the speed of movement of the hydraulic cylinder resulting from each of the command signals may include the step of applying command signals that gradually increase in level but that alternately produce movement of the cylinder and the machine element in opposite directions. The step of storing the level of the command signal required to cause the hydraulic cylinder to begin to move, and the speed of movement of the hydraulic cylinder resulting from each of the plurality of command signals of various levels may comprise the step of storing the command signal required to cause the hydraulic cylinder to begin to move, and storing the speed of movement of the hydraulic cylinder resulting from each of the plurality of command signals of various levels in a table for use in controlling the cylinder.

The step of automatically applying a low level command signal to the hydraulic valve for a predetermined period of time while monitoring the cylinder or element for movement and, if no movement is noted during the predetermined period of time, repeatedly increasing the level of the command signal for predetermined periods of time until movement is first noted, includes the step of estimating the velocity of the movement of the cylinder or machine element. Next, the estimate of velocity is confirmed to be greater than the threshold of noise. The velocity is in the expected direction and is also confirmed. The step of automatically applying a low level command signal to the hydraulic valve for a predetermined period of time while monitoring the cylinder or element for movement and, if no movement is noted during the predetermined period of time, repeatedly increasing the level of the command signal for predetermined periods of time until movement is first noted, may include the step of determining whether the amount of movement sensed exceeds a threshold before estimating the velocity of the movement of the cylinder or element.

The step of automatically applying in succession a plurality of command signals of various levels to the hydraulic valve while monitoring the ultrasonic sensor to determine the speed of movement of the hydraulic cylinder resulting from each of the command signals may include the step of storing, for each level of the command signals, a plurality of sensed positions of the hydraulic cylinder or machine element and the times at which such positions were sensed. The step of automatically applying in succession a plurality of command signals of various levels to the hydraulic valve while monitoring the ultrasonic sensor to determine the speed of movement of the hydraulic cylinder resulting from each of the command signals may further include the step of estimating the velocity resulting from each level of the command signals. The step of estimating the velocity resulting from each level of the command signals may include the step of ignoring sensed positions and times which are aberrational.

The method may further comprise the step of verifying that inconsistencies do not appear in the level of the command signal required to cause the hydraulic cylinder to begin to move, and the speed of movement of the hydraulic cylinder resulting from each of the plurality of command signals of increasing level.

The method has applicability to calibrating automatically an electrically actuated hydraulic valve in a system that controls the flow of hydraulic fluid to a hydraulic cylinder in an asphalt screed. In such an arrangement, the hydraulic cylinder controls the tow point of the screed, and the system includes an ultrasonic sensor that provides an indication of the position of the tow arm of the screed.

Accordingly, it is an object of the present invention to provide a method of calibrating an electrically actuated hydraulic valve that controls the application of hydraulic fluid to a hydraulic cylinder in a machine using an ultrasonic sensor.

DETAILED DESCRIPTION OF THE PREFERRED EMBODIMENTS

Figure 1:
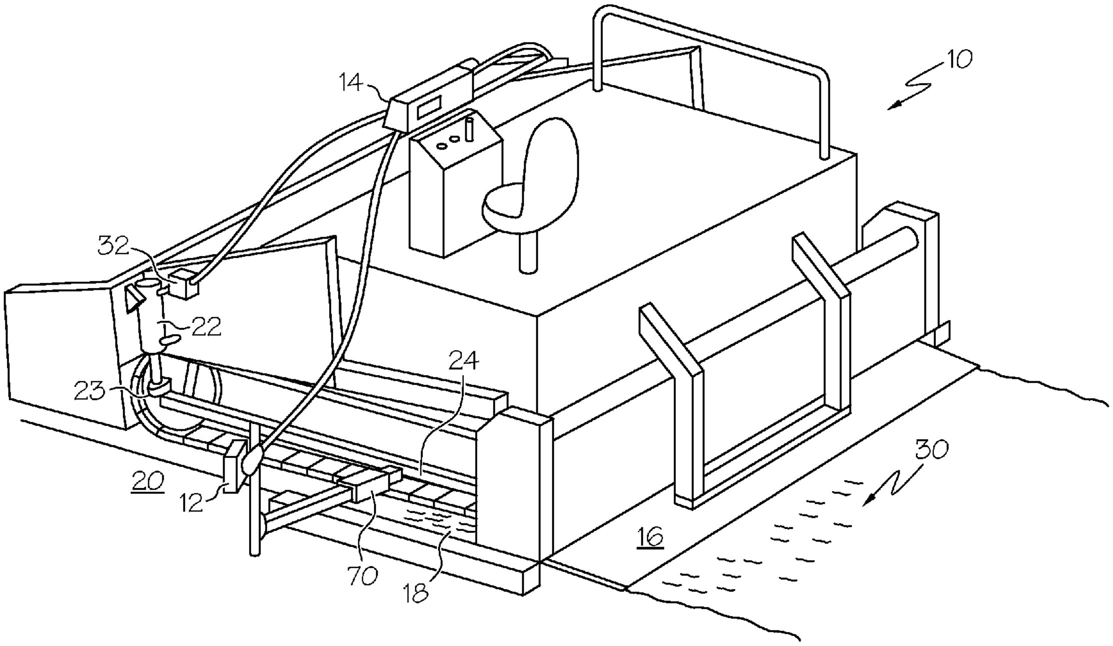
FIG. 1 is a perspective view, showing the general construction of an asphalt paving machine.

FIG. 1 of the drawings illustrates an asphalt paving machine 10 of the type with which the method of the present invention is utilized. It will be appreciated, however, that the present invention may be used for automatic valve calibration with other types of earth moving machines, and with similar machines that operate with an ultrasonic sensor as part of the machine control system.

The paving machine 10 has an ultrasonic transducer 12 which provides an output to a paving machine control 14. The paving machine 10 includes a paver blade (usually referred to as a "screed") 16. As the paving machine moves along, the screed pushes forward a quantity of paving material 18 such as asphalt, with a portion of the asphalt passing beneath the screed to form a layer on the roadbed. The paving material 18 which may also be sand, or the like, is leveled by the blade 16 into the desired surface configuration. The basic operation of the paving machine 10 is similar in some respects to that of grader, in that the blade 16 is raised and lowered to compensate for the level of a reference surface 20. The arrangement of the screed 16 of the paving machine 10 is, of course, somewhat different than that of the blade of a grader. Thus, the screed 16 is connected at the forward end of the paver machine 10 to hydraulic cylinders 22 by means of tow arms 24 at tow points 23. One of the hydraulic cylinders 22 and one of the tow arms 24 are shown in FIG. 1, with the other of the hydraulic cylinders 22 and tow arms 24 being located on the opposite side of the paving machine 10. As the forward ends of the tow arms 24 are raised, the change in the height of the leading edge and the angle of attack of the screed 16 cause the screed to gradually move upward, resulting in a thicker layer of asphalt 30. Conversely, as the tow arms 24 are lowered by cylinders 22, the leading edge of the screed 16 lowers, and digs into the paving material 18 somewhat, resulting in a lower pavement surface 30. Thus, although the physical configurations of the blade of a motor grader and the screed of a paving machine are not identical, the functions of these blades are analogous. Note that the ultrasonic transducer 12 is mounted on tow arm 24 and moves vertically with tow arm 24 and with screed 16. Ultrasonic transducer 12 therefore provides the paving machine control 14 with an indication of the position of the screed 16 with respect to the reference surface 20.

When the paver is operated, it may be desired that a surface 30 be produced with the asphalt pavement in which that its height matches that of the reference surface 20. To do this the operator of the paving machine 10 will first adjust the height of the screed 16 such that, as the paving material 18 is pushed along, the resulting paved height of the surface 30 is at the same level as the reference surface 20. Once the blade 16 is adjusted to the appropriate height, the paving machine 10 determines the distance to the reference surface 20 and uses this set point to control hydraulic valves 32 and cylinders 22. By raising the tow point 23 with the cylinders 22, the screed 16 is controlled. In this manner, the height of surface 30 is set to track the height of adjacent surface 20.

Figure 6:
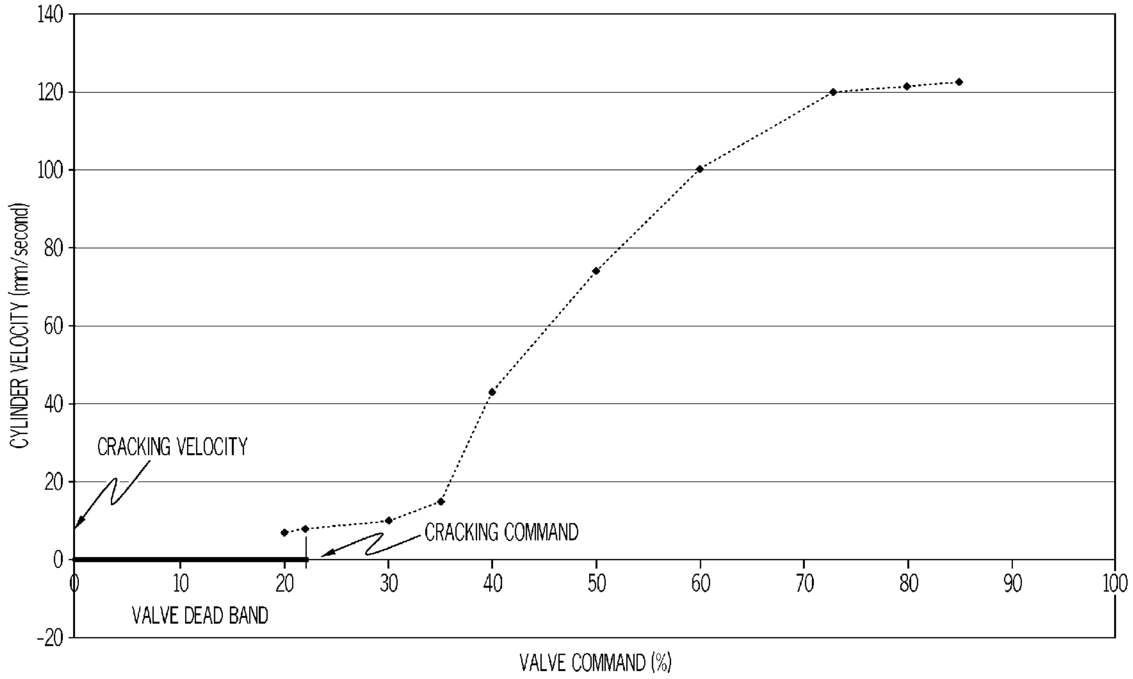
FIG. 6 is a graph depicting valve command levels versus velocity data points.

At the time that the system is installed on the paving machine 10, it is necessary to calibrate the hydraulic valves 32 which control the application of hydraulic fluid to each of the hydraulic cylinders 22. That is, it is necessary to determine and store the operating characteristics of each of the valves 32 so that this information may be used by the machine control 14 to operate the valves 32 in a desired manner. These operating characteristics for one valve are illustrated in the Valve Command versus Velocity graph of FIG. 6. It will be appreciated that the hydraulic cylinders 22 can be driven in either of two directions, either in a direction extending the cylinders or in the opposite direction in which the cylinders retract. FIG. 6 shows the operating characteristics in only one such direction. As will be noted, there is a dead band from a valve command of 0% to a valve command of approximately 22%. Between 0% and 22%, the command signal to the valve 32 produces no movement, or essentially no movement, of the hydraulic cylinder. The lowest valve command that is sufficient to produce a minimum movement of the hydraulic cylinder piston, illustrated as 22% at a velocity of 8 mm./sec., is called the "cracking current." Any command level less than 22% produces no movement, and valve commands in excess of the 22% cracking current produce movement of the cylinder at same velocity. As will be noted, the velocity of cylinder movement is directly related to the level of the valve command, although this is not a linear relationship.

Figure 7:
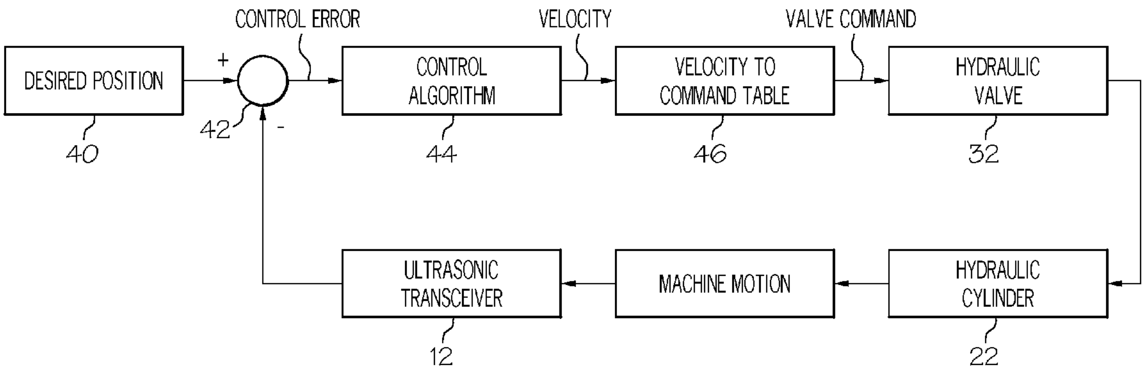
FIG. 7 is a schematic representation of a valve control system of the type used with the present invention.

It will be appreciated that by storing the data of FIG. 6, and the corresponding data for driving the hydraulic cylinder 22 in the opposite direction, the machine control 14 can set the valve command level to produce the desired cylinder extension or retraction speed. This control arrangement is illustrated in FIG. 7. A desired position 40 is compared with a sensed position from ultrasonic transducer 12 at 42, and an error signal supplied to a controller 44. Controller 44 uses a control algorithm, such as a proportional-integral-derivative controller (PID controller). This is a type of control loop feedback mechanism that is widely used in industrial control systems. A PID controller attempts to correct the error between a measured process variable and a desired set point by calculating and then outputting a corrective action that can adjust the process accordingly. In this case, the controller provides a velocity command to a velocity command table 46 where the velocity command is converted to a valve command level, based on stored data of the type illustrated in FIG. 6, to provide the appropriate valve command level to hydraulic valve 32. Actuating valve 32 results in cylinder 22 moving in the desired direction at the desired speed. The machine element, in this case the tow point 23 of the tow arm 24 is moved, and the output of the ultrasonic transducer 12 changes, changing the input to 42.

Figure 2:
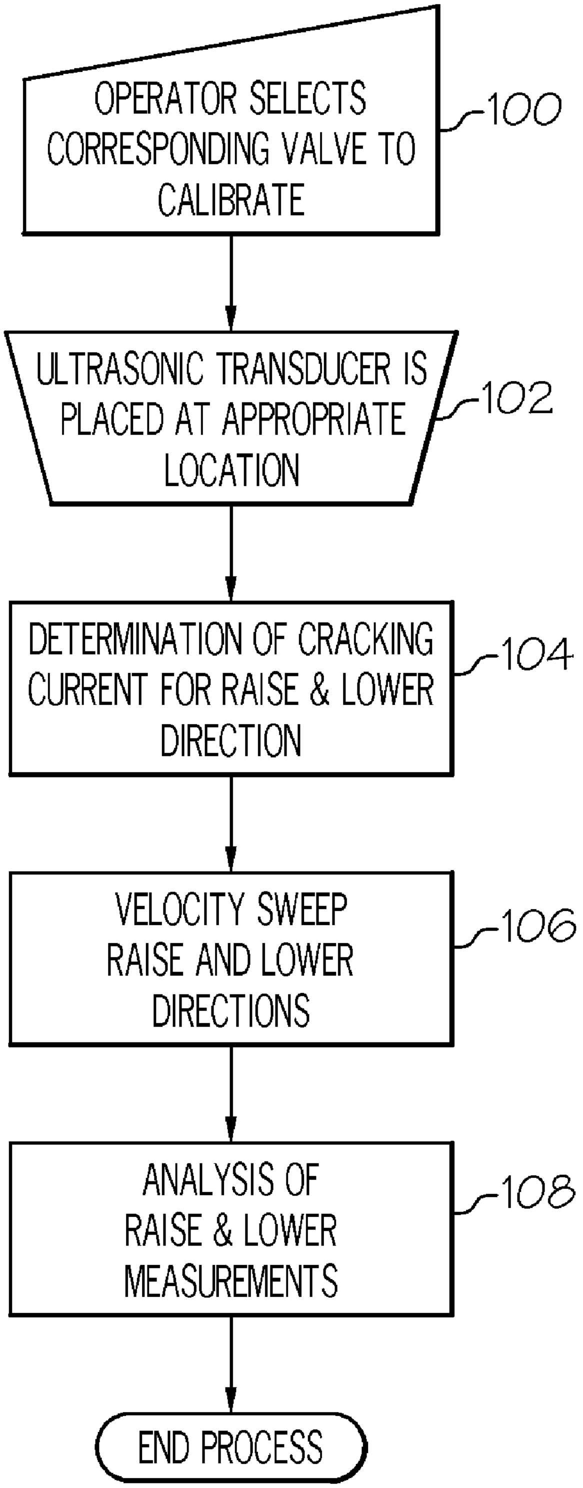
FIG. 2 is a flow chart, illustrating the overall method of the present invention.

The present invention utilizes the ultrasonic sensor 12 to monitor movement of the hydraulic cylinder 22 during calibration of valve 32 at the time that this system is installed on an asphalt paving machine 10. FIG. 2 provides an overview of the calibration process. In step 100, the operator selects which valve 32 is to be calibrated through a menu structure displayed on machine control 14. In step 102, the ultrasonic transducer is placed at an appropriate position. To accomplish this, a fitting 70 permits the transducer 12 to be shifted out of its normal operating position to a calibration position closer to the cylinder 22 and to the tow point 23 so that it monitors the movement of the tow point 23 closely. In step 104, a determination is made of the level of the cracking current needed to move the hydraulic cylinder minimally in both the raise and lower directions. Next, in step 106, a velocity sweep is made to determine the velocity of extension and retraction of the hydraulic cylinder when each of a number of different valve command levels is applied to the valve 32. Finally, an analysis is made of the valve characteristics in step 108, and the valid characteristic data points stored in non-volatile memory as a part of a velocity to command level table 46.

Figure 3:
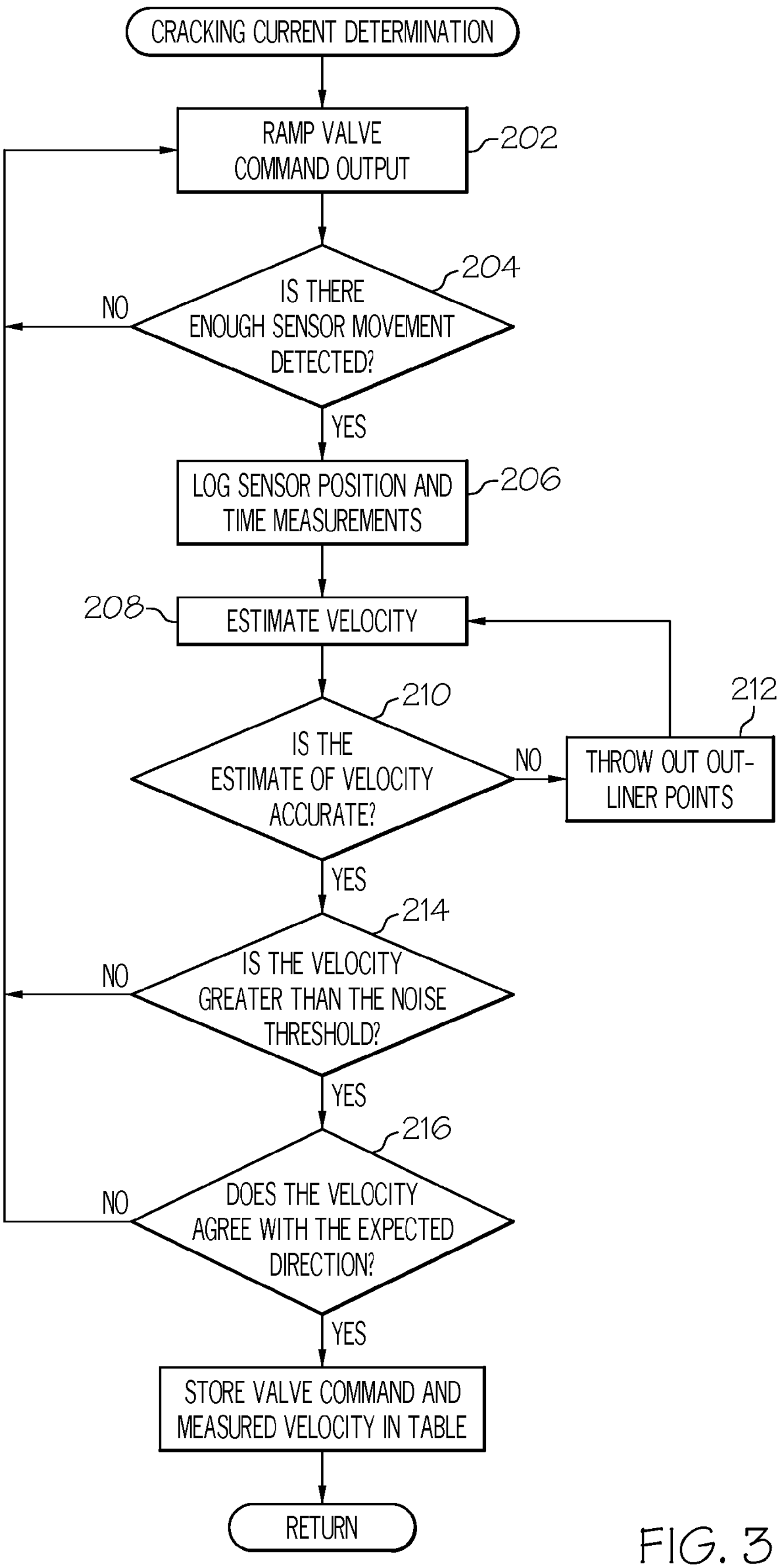
FIG. 3 is a flow chart, illustrating the method of determining valve cracking current in greater detail.

FIG. 3 illustrates the process by which the cracking current is determined in step 104. For this step, a command signal is automatically applied to the hydraulic valve 32 while monitoring the ultrasonic sensor 12 to determine the level of the command signal, i.e., the cracking current, required to cause the hydraulic cylinder 22 to begin to move. Although referred to here as a "current," the cracking current is a valve command of a type (analog, digital, PWM) that is appropriate for the valve being used, and that is the minimum level needed to cause appreciable movement of the hydraulic cylinder 22. The level of the valve command signal is increased slowly in a step-wise fashion in 202 and 204. The step duration is selected to be long enough that the noise from the ultrasonic transducer may be filtered out, and real movement detected. The ultrasonic transducer is monitored to determine whether there is an appreciable amount of movement and, if there is, then the sensed position and time is taken at a number of points in step 206. Next, based on this data, the velocity of the cylinder is estimated at 208, preferably by using a least squares curve fitting algorithm. Next, the resulting error for each actual measurement used in creating the estimate is calculated at 210. If there are data points that cause a large amount of error in the estimate, they are discarded at 212 and the velocity estimate recomputed using the remaining points. This velocity is then compared to a minimum detectable threshold velocity based on noise analysis at 214. If this velocity is greater than this threshold, the routine then checks to make sure that the direction or sign of the velocity agrees with the expected direction at 216. If either 214 or 216 are negative, no movement is assumed, and the algorithm continues to ramp the valve command levels at 202. Once the cracking current has been established in both directions, the values are stored in the table 46.

Figure 4:
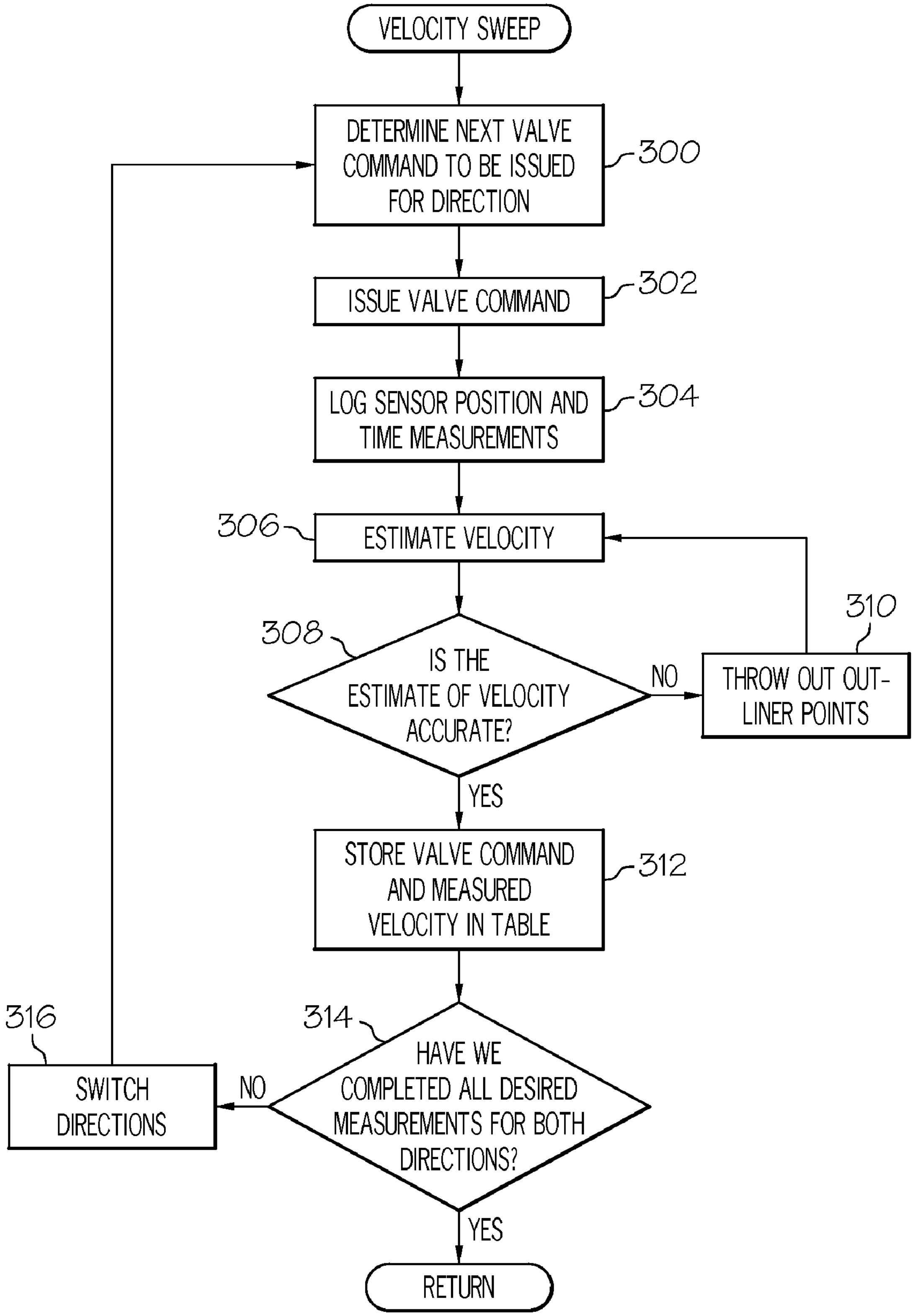
FIG. 4 is a flow chart, illustrating the method of performing a valve velocity sweep in greater detail.

FIG. 4 illustrates the velocity sweep 106 in which a plurality of command signals of various levels, for example increasing levels, are automatically applied in succession to the hydraulic valve 32 while monitoring the ultrasonic sensor 12 to determine the speed of movement of the hydraulic cylinder 22 resulting from each of the command signals. In step 300 a valve command is issued. The direction of movement of the hydraulic cylinder 22 is alternated for each successive valve command. A valve command is issued at 302, and the resulting ultrasonic position and time measurements are logged at 304. From this data, an estimate of velocity is made at 306, essentially using the same approach as was taken for determining velocity with regard to the cracking current determination, above. The velocity of the cylinder 22 is estimated at 306, preferably in using a least squares curve fitting algorithm. Next, the resulting error for each measurement with respect to this estimate is calculated at 308. If there are points that cause a large amount of error in the estimate, they are discarded at 310 and the estimate recomputed using the remaining data points. The valve command and velocity table 46 is then stored at 312. Finally, a determination is made at 314 as to whether all desired measurements have been made for both directions of hydraulic cylinder movement. If more data points are required, then the direction is reversed at 316, and a new valve command is determined at 300. The step size of each successive valve command for each direction may be based on maximizing the distribution of data points over the estimated valve command range, assuming some maximum detectable velocity.

Figure 5:
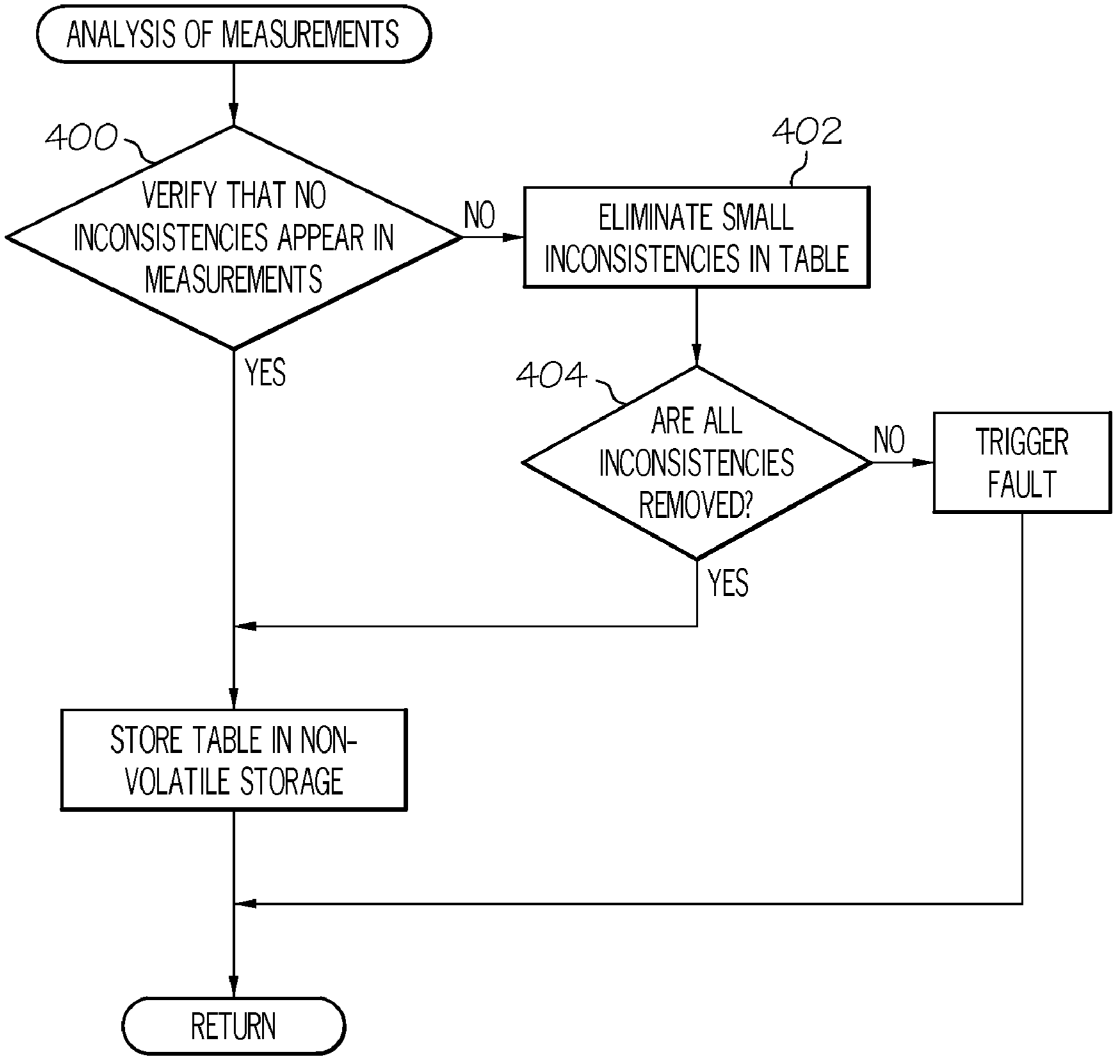
FIG. 5 is a flow chart, illustrating the method of analyzing measurements in greater detail.

Finally, FIG. 5 illustrates the step of analyzing the measurements that have been made in the above steps. The valve command level to velocity data table that has been assembled is checked to insure that it is monotonic at 400, that is, that the measured velocity increases as the valve command level increases. If the table is not monotonic, then small inconsistencies in the table are eliminated at 404 prior to storing the table in non-volatile storage at 406 for long term usage as table 46.

The present invention has been illustrated as having utility in calibrating an electrically actuated hydraulic valve that controls a hydraulic cylinder, where the hydraulic cylinder moves the tow point of a screed in a paving machine. However, it should be appreciated that the present invention has wider application. For example, this method of automatic valve calibration may be used to calibrate valves that control the flow of hydraulic fluid in machines of all types in which a machine element is moved with a hydraulic cylinder and the movement sensed with a ultrasonic transducer.

Various changes in the described method are contemplated as being within the scope of the present invention. For example, step 106 provides for making a velocity sweep to determine the velocity of extension and retraction of the hydraulic cylinder when each of a number of different valve command levels is applied to the valve 32. FIG. 4 illustrates this sweep being made by alternating the direction of movement of the hydraulic cylinder and by issuing increasing levels of valve command over the operating range. It should be appreciated, however, that the same collection of velocity and command level data points could be collected by beginning at the maximum command level and decreasing successive valve commands issued. Other variations can be made in the method. For example, the automated aspect of the invention may be used for determination of the cracking current level, as shown in FIG. 3, while making a velocity sweep in a manual mode. Similarly, it is possible that the velocity sweep might be made on an automated basis, while leaving the determination of the cracking current to a manual, operator-controlled process.

Other aspects, objects, and advantages of the present invention can be obtained from a study of the drawings, the disclosure, and the appended claims.

What is claimed is:

1. A method of automatically calibrating an electrically actuated hydraulic valve in a system that controls the flow of hydraulic fluid to a hydraulic cylinder connected to a machine element, said system including a sensor providing an indication of the position of the machine element, comprising the steps of:

automatically applying a command signal to said hydraulic valve while monitoring said sensor to determine the level of said command signal required to cause said hydraulic cylinder to begin to move;

automatically applying in succession a plurality of command signals of various levels to said hydraulic valve while monitoring said sensor to determine the speed of movement of said hydraulic cylinder resulting from each of said command signals; and storing said level of said command signal required to cause said hydraulic cylinder to begin to move, and storing the speed of movement of said hydraulic cylinder resulting from each of said plurality of command signals of various levels.

2. The method of claim 1, further including the step of selecting a valve to calibrate.

3. The method of claim 1, further including the step of positioning a sensor at an appropriate position to monitor movement of said cylinder or movement of said machine element.

4. The method of claim 1 in which said step of automatically applying a command signal to said hydraulic valve while monitoring said sensor to determine the level of said command signal required to cause said hydraulic cylinder to begin to move includes the step of automatically applying a low level command signal to said hydraulic valve for a predetermined period of time while monitoring said cylinder or element for movement and, if no movement is noted during the predetermined period of time, repeatedly increasing the level of said command signal for predetermined periods of time until movement is first noted.

5. The method of claim 1 in which the step of automatically applying in succession a plurality of command signals of various levels to said hydraulic valve while monitoring said sensor to determine the speed of movement of said hydraulic cylinder resulting from each of said command signals includes the step of applying command signals that gradually change level but that alternately produce movement of said cylinder and said machine element in opposite directions.

6. The method of claim 1 in which the step of storing said level of said command signal required to cause said hydraulic cylinder to begin to move, and the speed of movement of said hydraulic cylinder resulting from each of said plurality of command signals of various levels comprises the step of storing said command signal required to cause said hydraulic cylinder to begin to move, and the speed of movement of said hydraulic cylinder resulting from each of said plurality of command signals of various levels in a table for use in controlling said cylinder.

7. The method of claim 4 in which the step of automatically applying a low level command signal to said hydraulic valve for a predetermined period of time while monitoring said cylinder or element for movement and, if no movement is noted during the predetermined period of time, repeatedly increasing the level of said command signal for predetermined periods of time until movement is first noted, includes the step of estimating the velocity of the movement of the cylinder or machine element, confirming that the estimate of velocity is greater than a noise threshold, and confirming that the direction of the velocity is the expected direction.

8. The method of claim 7 in which the step of automatically applying a low level command signal to said hydraulic valve for a predetermined period of time while monitoring said cylinder or element for movement and, if no movement is noted during the predetermined period of time, repeatedly increasing the level of said command signal for predetermined periods of time until movement is first noted, includes the step of determining whether the amount of movement sensed exceeds a threshold before estimating the velocity of the movement of said cylinder or element.

9. The method of claim 1 in which the step of automatically applying in succession a plurality of command signals of various levels to said hydraulic valve while monitoring said sensor to determine the speed of movement of said hydraulic cylinder resulting from each of said command signals includes the step of storing, for each level of said command signals, a plurality of sensed positions of the cylinder or machine element and the times at which such positions were sensed.

10. The method of claim 9 in which the step of automatically applying in succession a plurality of command signals of various levels to said hydraulic valve while monitoring said sensor to determine the speed of movement of said hydraulic cylinder resulting from each of said command signals further includes the step of estimating the velocity resulting from each level of said command signals.

11. The method of claim 10 in which the step of estimating the velocity resulting from each level of said command signals includes the step of ignoring sensed positions and times which are aberrational.

12. The method of claim 1, further comprising the step of verifying that inconsistencies do not appear in said level of said command signal required to cause said hydraulic cylinder to begin to move, and the speed of movement of said hydraulic cylinder resulting from each of said plurality of command signals of various levels.

13. The method of claim 1, in which the step of automatically applying in succession a plurality of command signals of various levels to said hydraulic valve while monitoring said sensor to determine the speed of movement of said hydraulic cylinder resulting from each of said command signals includes the step of applying command signals of increasing levels to said hydraulic valve while monitoring said sensor to determine the speed of movement of said hydraulic cylinder.

14. A method of automatically calibrating an electrically actuated hydraulic valve in a system that controls the flow of hydraulic fluid to a hydraulic cylinder in an asphalt screed, said hydraulic cylinder controlling the tow point of said screed, said system including sensor providing an indication of the position of the tow arm of the screed, comprising the steps of:

automatically applying a command signal to said hydraulic valve while monitoring said sensor to determine the level of said command signal required to cause said hydraulic cylinder to begin to move;

automatically applying in succession a plurality of command signals of various levels to said hydraulic valve while monitoring said sensor to determine the speed of movement of said hydraulic cylinder and said tow point resulting from each of said command signals; and storing said level of said command signal required to cause said hydraulic cylinder to begin to move, and storing the speed of movement of said hydraulic cylinder resulting from each of said plurality of command signals of various levels.

15. The method of claim 14 further including the step of positioning a sensor at an appropriate position on said tow arm to monitor movement of said cylinder and movement of said tow point of said tow arm.

16. The method of claim 14 in which said step of automatically applying a command signal to said hydraulic valve while monitoring said sensor to determine the level of said command signal required to cause said hydraulic cylinder to begin to move includes the step of automatically applying a low level command signal to said hydraulic valve for a predetermined period of time while monitoring the movement of said cylinder and said tow point and, if no movement is noted during the predetermined period of time, repeatedly increasing the level of said command signal for predetermined periods of time until movement is first noted.

17. The method of claim 14 in which the step of automatically applying in succession a plurality of command signals of various levels to said hydraulic valve while monitoring said sensor to determine the speed of movement of said hydraulic cylinder resulting from each of said command signals includes the step of applying command signals that gradually increase in level but that alternately produce movement of said cylinder and said tow point in opposite directions.

18. The method of claim 14 in which the step of storing said level of said command signal required to cause said hydraulic cylinder to begin to move, and the speed of movement of said hydraulic cylinder resulting from each of said plurality of command signals of various levels comprises the step of storing said command signal required to cause said hydraulic cylinder to begin to move, and the speed of movement of said hydraulic cylinder resulting from each of said plurality of command signals of various levels in a table for use in controlling said cylinder.

19. The method of claim 16 in which the step of automatically applying a low level command signal to said hydraulic valve for a predetermined period of time while monitoring said cylinder and said tow point for movement and, if no movement is noted during the predetermined period of time, repeatedly increasing the level of said command signal for predetermined periods of time until movement is first noted, includes the step of estimating the velocity of the movement of the cylinder or tow point of said tow arm, confirming that the estimate of velocity is greater than a noise threshold, and confirming that the direction of the velocity is the expected direction.

20. The method of claim 19 in which the step of automatically applying a low level command signal to said hydraulic valve for a predetermined period of time while monitoring said cylinder or element for movement and, if no movement is noted during the predetermined period of time, repeatedly increasing the level of said command signal for predetermined periods of time until movement is first noted, includes the step of determining whether the amount of movement sensed exceeds a threshold before estimating the velocity of the movement of said cylinder or element.

21. The method of claim 14 in which the step of automatically applying in succession a plurality of command signals of various levels to said hydraulic valve while monitoring said sensor to determine the speed of movement of said hydraulic cylinder resulting from each of said command signals includes the step of storing, for each level of said command signals, the a plurality of sensed positions of the cylinder or machine element and the times at which such positions were sensed.

22. The method of claim 21 in which the step of automatically applying in succession a plurality of command signals of various levels to said hydraulic valve while monitoring said sensor to determine the speed of movement of said hydraulic cylinder resulting from each of said command signals further includes the step of estimating the velocity resulting from each level of said command signals.

23. The method of claim 22 in which the step of estimating the velocity resulting from each level of said command signals includes the step of ignoring sensed positions and times which are aberrational.

24. The method of claim 14, further comprising the step of verifying that inconsistencies do not appear in said level of said command signal required to cause said hydraulic cylinder to begin to move, and the speed of movement of said hydraulic cylinder resulting from each of said plurality of command signals of various levels.

25. The method of claim 14, in which the step of automatically applying in succession a plurality of command signals of various levels to said hydraulic valve while monitoring said sensor to determine the speed of movement of said hydraulic cylinder resulting from each of said command signals includes the step of applying command signals of increasing levels to said hydraulic valve while monitoring said sensor to determine the speed of movement of said hydraulic cylinder.

26. A method of automatically calibrating an electrically actuated hydraulic valve in a system that controls the flow of hydraulic fluid to a hydraulic cylinder connected to a machine element, said system including a sensor providing an indication of the position of the machine element, comprising the steps of:

automatically applying in succession a plurality of command signals of various levels to said hydraulic valve while monitoring said sensor to determine the speed of movement of said hydraulic cylinder resulting from each of said command signals; and storing the speed of movement of said hydraulic cylinder resulting from each of said plurality of command signals of various levels.

27. A method of automatically calibrating an electrically actuated hydraulic valve in a system that controls the flow of hydraulic fluid to a hydraulic cylinder in an asphalt screed, said hydraulic cylinder controlling the tow point of said screed, said system including sensor providing an indication of the position of the tow arm of the screed, comprising the steps of:

automatically applying in succession a plurality of command signals of various levels to said hydraulic valve while monitoring said sensor to determine the speed of movement of said hydraulic cylinder and said tow point resulting from each of said command signals; and storing said speed of movement of said hydraulic cylinder resulting from each of said plurality of command signals of various levels.

* * * * *

UNITED STATES PATENT AND TRADEMARK OFFICE

CERTIFICATE OF CORRECTION

PATENT NO. : 8,061,180 B2
APPLICATION NO. : 12/043611
DATED : November 22, 2011
INVENTOR(S) : Francisco Roberto Green It is certified that error appears in the above-identified patent and that said Letters Patent is hereby corrected as shown below:

Col. 10, Claim 21, Line 22 “signals, the a plurality” should read --signals, the plurality--.

Signed and Sealed this
Twenty-first Day of February, 2012

David J. Kappos
*Director of the United States Patent and Trademark Office*